G. J. STUART.
COMPOUND REGULATING VALVE.
APPLICATION FILED SEPT. 22, 1915.
1,192,472.
Patented July 25, 1916.
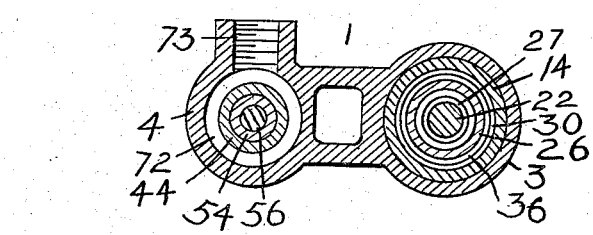
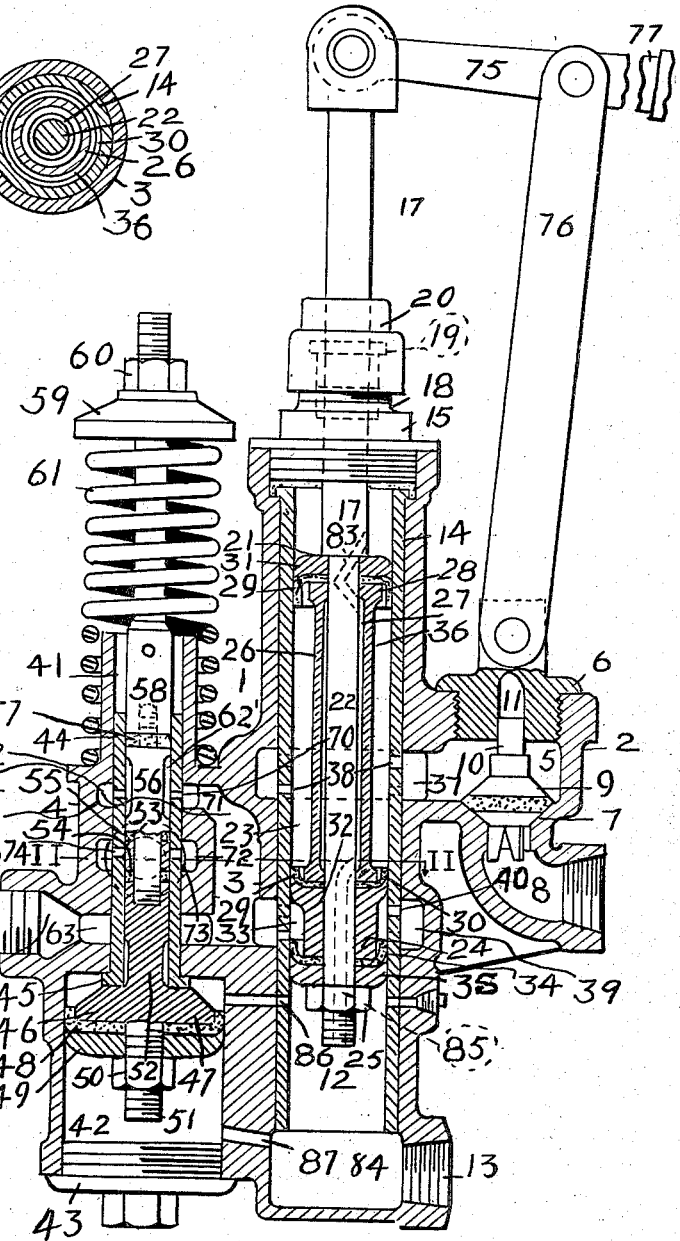
WITNESSES
INVENTOR
George J. Stuart
by F. N. Barber
attorney

UNITED STATES PATENT OFFICE.

GEORGE J. STUART, OF BELLEVUE, PENNSYLVANIA.

COMPOUND REGULATING-VALVE.

1,192,472.   Specification of Letters Patent.   Patented July 25, 1916.

Application filed September 22, 1915. Serial No. 52,016.

*To all whom it may concern:*

Be it known that I, GEORGE J. STUART, a citizen of the United States, residing at Bellevue, in the county of Allegheny and State of Pennsylvania, have invented new and useful Improvements in Compound Regulating-Valves, of which the following is a specification.

My invention relates to valves and has particular reference to valves for controlling the sequential flow of fluids at different pressures.

The object of my invention is to provide a valve by which fluid pressure of one value is released when a fluid pressure of a lower value builds up to a predetermined value.

Heretofore, it has been common to control the supply of two fluids of different pressures to a hydraulic press by means of two independent hand-operated valves, the exhaust being controlled by a third hand-operated valve.

It is my object to simplify the structure so that the admission of the higher pressure to the press or other device is controlled by the pressure of the fluid having the lower pressure after the latter has been built up to a certain value, as will be hereinafter explained.

Referring to the accompanying drawing, Figure 1 is a central longitudinal section of a valve constructed in accordance with the principles of my invention, and Fig. 2 is a cross-section of Fig. 1 on the line II—II.

On the drawings, 1 represents the valve casing as a whole, comprising three preferably parallel and integral valve-casings, 2 representing the check-valve casing, 3 the low-pressure valve casing, and 4 the high-pressure valve casing.

The casing 2 contains the chamber 5 closed at its top by the screw plug 6, provided with the valve seat 7, and a supply passage 8 for the low-pressure fluid. The chamber 5 contains the check-valve 9 adapted to the seat 7 and seating against the source of fluid supply through the passage 8. The stem 10 of the valve 9 slides in the opening 11 in the under side of the plug 6.

The casing 3 has the central longitudinal bore or opening 12 closed at its lower end and provided near the latter with the exhaust port 13. Within the opening 12 I provide the tubular liner 14 which may be replaced when worn or otherwise damaged. The upper end of the opening 12 is closed by the screw-plug 15. The valve-stem 17 reciprocates through a central hole in the plug 15, which has at its upper end the stuffing-box 18 in which the gland 19 is adjusted by means of the screw-cap 20 working on the exterior of the stuffing-box. The stem 17 is prolonged within the lining 14 from the shoulder 21 so as to form the valve-spindle 22 on which the balanced valves 23 and 24 are secured by the nut 25. The valve 23 comprises the central sleeve 26 which is centrally cored or hollowed out nearly from end to end leaving the annular passage 27 between the sleeve and the spindle, the ends of the sleeve preferably fitting the spindle closely as shown at 28. The ends of the sleeve 26 are in the depressed faces of the cup-leathers 29 and 30, the flanges of the cups, therefore, facing each other. The peripheries of the cup-leathers are in engagement with the inner wall of the liner 14 and are strung on the spindle 22. The cup-leather 29 is seated against the washer or block 31 which rests on the shoulder 21. The lower face of the cup-leather 30 is supported by the cylindrical block 32 having its lower portion reduced in diameter to provide the chamber 33 between the block and the liner. The lower end of the block 32 is seated in the hollow face of the cup-leather 34 of the valve 24. This cup-leather bears on the liner 14 and has the block 35 in engagement with its lower face, the nut 25 being screwed on the spindle 22 up against the block so as to bind all the parts on the spindle tightly together between the shoulder 21 and the nut. The sleeve 26 is smaller than the liner whereby the annular chamber 36 is provided. In the casing 3 there is the annular chamber 37 which communicates with the chamber 36 by means of the openings 38 in the liner 14, and with the chamber 5. There is in the casing 3 another annular chamber 39 which communicates with the chamber 33 by means of the openings 40 in the said liner.

The casing 4 is provided with the central bore or opening 41 which communicates at its lower end with the larger central opening or chamber 42, the latter being closed by the screw-plug 43. Within the opening 41 I place the tubular liner 44 having an enlarged portion or head 45 at its lower end resting against the top of the chamber 42.

In the chamber 42 the piston 46 reciprocates. It comprises the head 47 seated in the hollow face of the cup-leather 48 whose flange faces the top of the chamber 42. The lower face of the cup-leather is supported by the annular block or washer 49 which is engaged by the nut 50 on the stem 51 extending down through the cup-leather and the washer. The upper face of the head 47 bears the section 52 of the stem. This section extends up into the liner 44 and has the packing ring 53 on its upper end. On the packing 53 is the spacing ring 54 on which the packing ring 55 rests. The stem-section 56 has its lower end reduced, extending through the packing rings 53 and 55 and the ring 54, and screwed into the upper end of the stem-section 52. The upper end of the stem-section 56 supports the packing ring 57 which is clamped to the section 56 by the stem-section 58 screwed onto a reduced upper extension of the section 56. The stem-section 58 is extended upwardly above the casing 4 where it is provided with the washer 59 adjustable on the stem-section by the nut 60.

61 is a coiled expansion spring seated between the washer 59 and the external shoulder 62 on the casing 4.

62' is an annular chamber between the liner 44 and the section 56.

The liner 44 is surrounded by the annular chamber 63 which communicates with the chamber 64 in the connecting portion of the casings 3 and 4. The chamber 39 also communicates with the chamber 64. The chamber 63 also communicates with the port 65 which leads by the pipe 66 to the pressure chamber 67 of the hydraulic press 68. The liner 44 is surrounded by the chamber 69 which communicates with the chamber 62' by means of the ports 70 in the liner, and also with the chamber 64 by the passage 71. The liner 44 is also surrounded by the chamber 72 which communicates with the port 73 for the fluid having a higher pressure than the fluid which enters the port 8, and also with the ports 74 in the liner 44. The ports 70 and 74 are arranged to be spanned by the chamber 62' when the valves in the liner 44 descend to their lower limit or to a predetermined place.

75 is the operating lever pivoted between its ends to the link 76 having its lower end pivoted to the top of the plug 6. One end of the lever has the handle 77 and the other end is pivoted to the top of the stem 17.

The plunger 79 of the press 68 extends into the chamber 67 and bears on its upper end the movable member 80 between which and the upper horizontal member 81 any article, as 82, to be pressed is placed.

Any fluid getting above the washer 31 is drained into the chamber 27 by the passage 83, the latter draining into the exhaust chamber 84 below the valve 24 by way of the passage 85 in the spindle 22.

The chamber 42 above the piston 46 communicates with the exhaust chamber 84 through the passage 86, and below the valve through the passage 87.

The parts of the apparatus being in the position shown, the handle 77 of the lever is raised causing the stem and parts connected thereto to descend so that the cup-leather 30 stands below the passage 86, and the cup-leather 29 stands still above the ports 38. The low pressure fluid, having, for example, 150 pounds pressure per square inch, passes through the port 8, the valve-seat 7, the chamber 5, the ports 38, the chamber 36, the ports 40, the chambers 39, 64, and 63, the port 65, and the pipe 66 to the pressure chamber 67 of the hydraulic press whose plunger 79 and table 80 with an article 82 require, for example, a pressure of 75 pounds to lift them. The fluid is constantly provided with increasing space so long as the plunger rises freely, so that the pressure in the chamber 67 and, therefore, in the chamber 64 and the chamber 42 above the piston 46, will remain not much above 75 pounds until the article 82 engages the horizontal member 81, when the upward movement of the plunger is very much retarded or possibly nearly stopped. When this occurs the pressure in the chambers 67 and 64 and the chamber 42 above the piston 46 begins to build up. The tension of the spring 61 is so adjusted that it will be overcome by a pressure on the top of the valve of over 75 pounds but not in excess of 150 pounds, for example. The spring can be so constructed or adjusted that the valve 46 will be lowered at any predetermined value between 75 and 150 pounds. When the pressure in the upper part of the chamber 42 builds up so as to depress the valve 46 and the stem sections connected thereto, the packing ring 55 will come to rest below the ports 74 and the packing ring 57 will remain above the ports 70, so that the fluid having the higher pressure, 1000 pounds per square inch, for example, flows through the port 73, the chamber 72, the ports 74, the chamber 62', the ports 70, the passages 64 and 63, and the port 65 to the press-chamber 67, thereby causing the article 82 to be subjected to a pressure much in excess of that transmitted thereto by the low-pressure fluid. The high-pressure is also transmitted back from the chamber 64 to the chamber 5, thereby causing the check-valve 9 to be closed on the seat 7.

When the handle of the lever is moved so as to bring the valve 24 above the ports 40, the pressure in the chamber 42 above the piston 46 escapes into the exhaust chamber 84 by way of the passage 86, thereby permitting the spring 61 to move the piston 46 and connected parts to the position in which the packing rings 53 and 55 are on opposite sides of the ports 74, thereby cutting off the high pressure from all the pressure chambers except the chamber 72. This takes place after the cup-leather 34 passes the port 86 and before it passes the ports 40. As soon as the cup-leather passes the ports 40 the pressure in the chambers 64, 63, and 67 and connected passages and ports escapes into the exhaust chamber 84 by way of the chamber 39 and the ports 40.

When the lever is operated to bring the parts to the position shown, no fluid can pass through the valve because the low-pressure fluid is held in the chamber 36 between the balanced ends of the valve 23, and the spring 61 holds the valve 46 and connected ports so as to cut the high-pressure passage 72 off from the chamber 62' and connected chambers, ports and passages.

I do not desire to be restricted to the precise elements and combinations shown and described as many changes therein can be made without departing from the spirit of my invention.

I claim—

1. In a valve, a casing, a chamber therein, means for admitting a fluid under pressure thereto, means for admitting a fluid under a higher pressure to the said chamber, the second means being operated by the first-named fluid when it reaches a predetermined value and an exhaust passage connectible to the chamber, but only after the second means cuts off from the chamber the fluid under the higher pressure.

2. In combination, a casing, a chamber therein, means for admitting a fluid under pressure to the chamber, means for causing the pressure in the chamber to be temporarily below the normal pressure of the said fluid, means controlled by the said fluid in the chamber, when the pressure thereof is built up to a predetermined value, for admitting to the chamber a fluid having a pressure higher than that of the first-named fluid and an exhaust passage connectible to the chamber, but only after the third means cuts off from the chamber the fluid under the higher pressure.

3. In combination, a casing, a chamber therein, means for admitting a fluid under pressure to the chamber, means for causing the pressure in the chamber to be temporarily below the normal pressure of the said fluid, means controlled by the said fluid in the chamber, when the pressure thereof is built up to a predetermined value, for admitting to the chamber a fluid having a pressure higher than that of the first-named fluid, means for adjusting the said predetermined value and an exhaust passage connectible to the chamber, but only after the third means cuts off from the chamber the fluid under the higher pressure.

4. In a valve, a casing, a chamber therein, means for admitting a fluid under pressure to the chamber, means for admitting a fluid under a higher pressure to the chamber, the second means being operable automatically by the pressure in the chamber when the pressure reaches a predetermined value, and an exhaust passage, the first means being adapted to arrest the flow to the chamber of the fluid under the lower pressure or to connect the chamber to the exhaust passage.

5. In a valve, a casing, a chamber therein, means for admitting a fluid under pressure to the chamber, means for admitting a fluid under a higher pressure to the chamber, the second means being operable automatically by the pressure in the chamber when the pressure reaches a predetermined value, and an exhaust passage, the first means being adapted to arrest the flow to the chamber of the fluid under the lower pressure without opening the exhaust passage or to connect the chamber to the exhaust passage.

Signed at Pittsburgh, Pa., this 17th day of July, A. D. 1914.

GEORGE J. STUART.

Witnesses:
F. N. BARBER,
ANNA R. BEATTY.